United States Patent [19]

Mieno et al.

[11] Patent Number: 4,788,822
[45] Date of Patent: Dec. 6, 1988

[54] APPARATUS FOR CONTROLLING BOOST PRESSURE IN TURBOCHARGED INTERNAL COMBUSTION ENGINES

[75] Inventors: Toshiyuki Mieno; Toyohei Nakajima; Akira Tanaka; Akira Nagao, all of Wako, Japan

[73] Assignee: Honda Giken Kogyo Kabushiki Kaisha, Tokyo, Japan

[21] Appl. No.: 74,604

[22] Filed: Jul. 17, 1987

[30] Foreign Application Priority Data

Jul. 22, 1986 [JP] Japan .................. 61-170932

[51] Int. Cl.$^4$ .................. F02B 37/12; F02P 5/15
[52] U.S. Cl. .................. 60/602; 123/425
[58] Field of Search .................. 60/600, 601, 602, 603, 60/611; 123/564, 425

[56] References Cited

U.S. PATENT DOCUMENTS 4,509,331 4/1985 Hirabayashi .................. 60/602
4,715,184 12/1987 Oosawa et al. .................. 123/564 X

FOREIGN PATENT DOCUMENTS

3303350 8/1984 Fed. Rep. of Germany ........ 60/602
167881 10/1983 Japan .
243346 12/1985 Japan .................. 60/602

Primary Examiner—Michael Koczo
Attorney, Agent, or Firm—Armstrong, Nikaido, Marmelstein & Kubovcik

[57] ABSTRACT

A method of and an apparatus for controlling boost pressure in a turbocharged internal combustion engine. A turbine disposed in the engine exhaust passage is driven by exhaust gas and in turn drives a compressor disposed in the engine air intake passage, thus boosts the engine combustion chamber by delivering pressurized air thereto. The boost pressure is reduced when the actual ignition timing becomes more retarded than a reference ignition timing. The reference ignition timing is varied in proportion to an engine speed and/or an intake air pressure. Since the decision whether or not to reduce the boost pressure is based on the ignition timing actually being applied to the engine, no risk of damage to the engine arises and unnecessary reduction of engine output can be reliably prevented, enabling the engine to operate with optimum performance.

2 Claims, 6 Drawing Sheets

| Pb\Ne | Pb1 | Pb2 | ---------- | Pbj |
|---|---|---|---|---|
| Ne1 | θT11 | θT12 | | θT1j |
| Ne2 | θT21 | θT22 | | θT2j |
| ⋮ | | | | |
| Nei | θTi1 | θTi2 | | θTij |

APPARATUS FOR CONTROLLING BOOST PRESSURE IN TURBOCHARGED INTERNAL COMBUSTION ENGINES

BACKGROUND OF THE INVENTION

1. Field of the Invention

This invention relates to a method of and an apparatus for controlling boost pressure in a turbocharged internal combustion engine and more particularly to a method of and an apparatus for controlling boost pressure in an internal combustion engine equipped with a turbocharger wherein the timing of boost pressure reduction is determined relative to the ignition timing.

2. Description of the Prior Art

In an internal combustion engine equipped with a turbocharger, it is conventional practice to reduce the boost pressure when the amount of retardation of the ignition timing with respect to the basic ignition timing comes to exceed a predetermined value. This practice is followed, for example, in Japanese Laid-open Patent Application No. 58(1983)-167881.

Figure 7A:
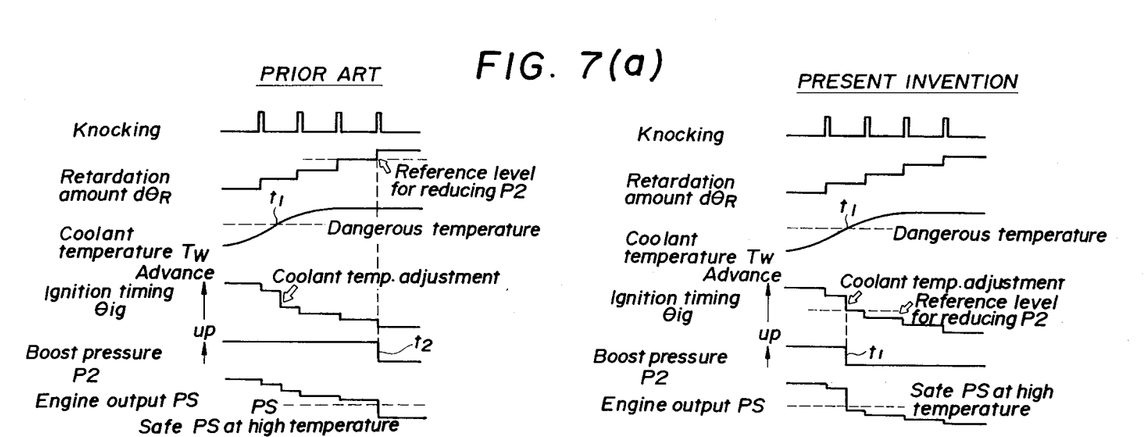
FIG. 7(a) and FIG. 7(b) are explanatory diagrams comparing the present invention and the prior art.
Figure 7B:
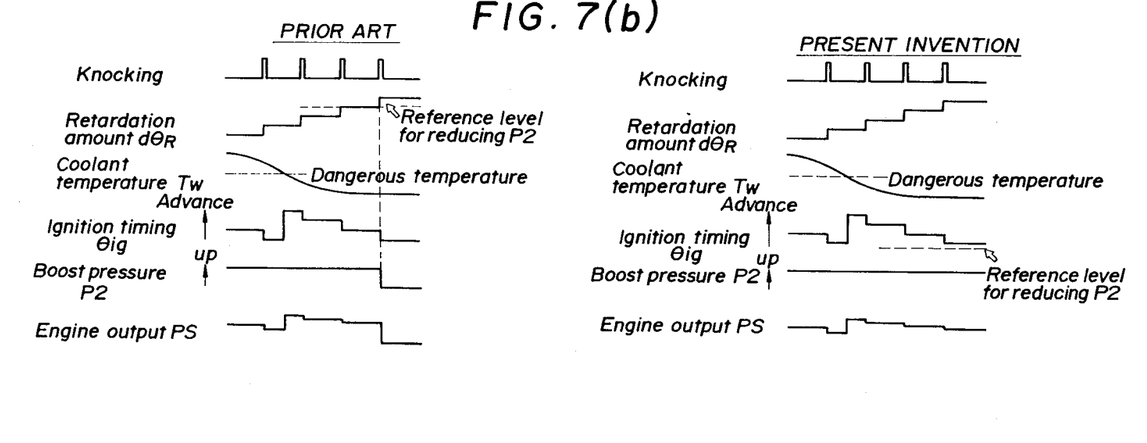

FIG. 7(a) and FIG. (b) show a comparison of the prior art and the present invention. As seen in FIG. 7(a), in the prior art the boost pressure P2 is reduced when the amount of ignition retardation $d\theta R$ for prevention of knocking comes to exceed a predetermined reference level. In contrast, in the present invention a decision as to whether or not the boost pressure should be reduced is made based not on the amount of ignition retardation but on the actual ignition timing $\theta ig$ obtained by subtracting the ignition retardation amount from the basic ignition timing, and when the actual ignition timing $\theta ig$ exceeds a predetermined reference level the boost pressure is reduced. In this example, when the engine coolant temperature Tw at time t1 is higher than a temperature above which there is danger of damage to the engine, the ignition timing $\theta ig$ is retarded considerably both in the prior art and in the present invention. In the present invention, however, carrying out a retardation of the ignition timing by an amount large enough to eliminate such an abnormal condition causes the actual ignition timing $\theta ig$ to immediately exceed the reference level above which the boost pressure is to be reduced so that the boost pressure is immediately reduced at the same time t1 and, as a result, the engine output PS is immediately brought to within the safety limit. On the other hand, in the prior art the boost pressure is not reduced until the amount of retardation $d\theta R$ reckoned relative to the basic ignition timing comes to exceed the reference level at the time t2. In the meantime, the engine output remains outside the safety limit so that there is a danger of the engine being damaged. Further, as shown in FIG. 7(b), in the prior art the boost pressure is reduced every time the retardation amount $d\theta R$ exceeds the reference level, even when there is in fact no need for it to be reduced. As a result, unnecessary loss of engine output frequently results. In the present invention, the actual ignition timing $\theta ig$ does not exceed the basic level under such circumstances and, accordingly, there is no unnecessary reduction in the boost pressure. The problem with the prior art is thus that the decision regarding reduction of the boost pressure is made with reference only to the amount of ignition timing retardation carried out for preventing of knocking, i.e. without reference to changes in ignition timing made necessary by changes in the engine operating condition or environment. As a result, the prior art practice entails a risk of damage to the engine and causes unnecessary reductions in the engine output.

SUMMARY OF THE INVENTION

In consideration of the aforesaid shortcomings of the prior art, it is an object of the invention to provide a method of and an apparatus for controlling boost pressure in a turbocharged internal combustion engine wherein the decision as to whether the boost pressure is to be reduced is made with reference to the actual ignition timing which has been adjusted in light of changes in the engine operating condition and the engine operating environment, whereby damage to the engine and unnecessary reduction in engine output are prevented.

For achieving this object, the invention provides in its first aspect, in a method of controlling boost pressure in a turbocharged internal combustion engine while determining ignition timing for the engine and adjusting the ignition timing by a predetermined amount when knocking occurs, the improvement which comprises, the boost pressure is reduced when the ignition timing becomes more retarded than a prescribed value. And the invention provides in its second aspect, an apparatus for controlling boost pressure in a turbocharged internal combustion engine which comprises, a device for detecting an engine operating condition disposed at an appropriate part of the engine, a device for detecting knocking occurring in a combustion chamber of the engine disposed at an appropriate part of the engine, a device for determining ignition timing on the basis of the outputs of the operating condition detection device and the knocking detection device, ignition device for igniting an air/fuel mixture in the engine combustion chamber on the basis of the output of the ignition timing determining device, a device for controlling boost pressure in an engine air intake passage on the basis of the output of the ignition timing determining device, and a device for supplying the boost pressure in the passage on the basis of the output of the boost pressure controlling device, wherein the improvement comprises, the boost pressure is reduced when the ignition timing becomes more retarded than a prescribed value.

The above and other features of the present invention will become apparent from the following description made with reference to the drawings.

DESCRIPTION OF THE PREFERRED EMBODIMENTS

Firstly, embodiments of the invention will now be explained with reference to the drawings.

Figure 1:
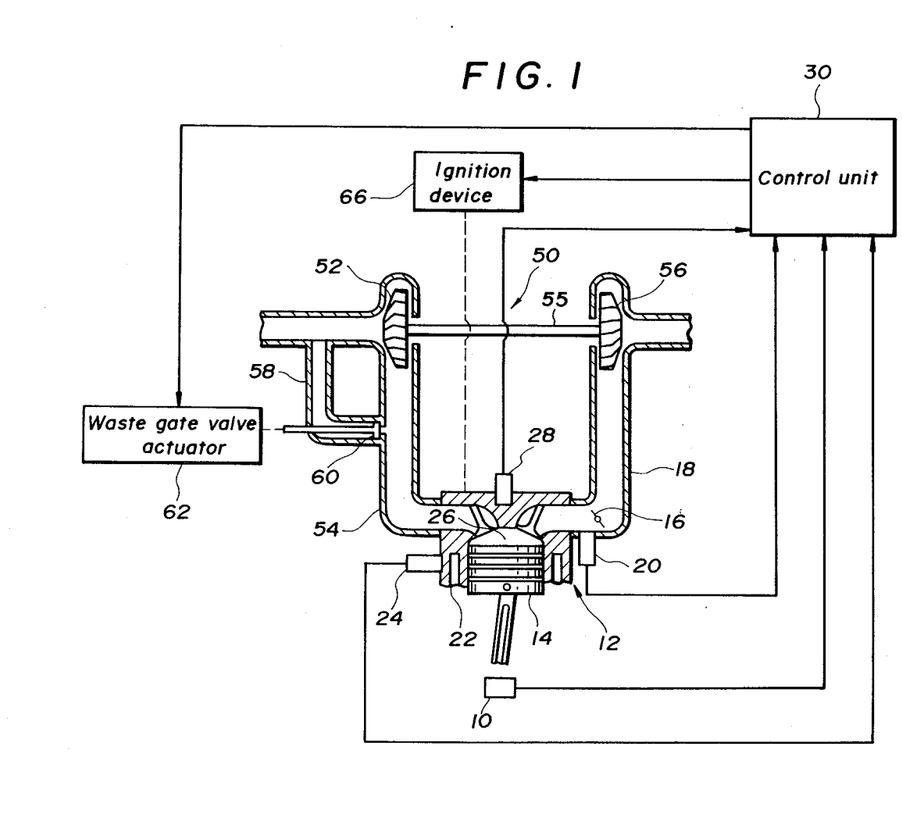
FIG. 1 is an explanatory view of the overall arrangement of an apparatus for controlling boost pressure in a turbocharged internal combustion engine according to the present invention.

FIG. 1 shows the overall arrangement of an apparatus for controlling boost pressure in a turbocharged internal combustion engine according to the invention. As shown in the figure, a crankshaft angle sensor 10, which may be constituted using an electromagnetic pickup or the like, is disposed in the vicinity of a rotating member of a four-cylinder internal combustion engine 12 for detecting changes in the crankshaft angle of the internal combustion engine 12 caused by reciprocating movement of pistons 14 (only one shown. A throttle valve 16 is provided in an air intake passage 18 of the internal combustion 12 and a pressure sensor 20 is provided downstream of the throttle valve 16 for detecting the absolute pressure of an air flowing at this point. On a cylinder block 22 of the engine there is mounted a coolant temperature sensor 24 for detecting the temperature of the engine coolant. The internal combustion engine 12 is further provided in the vicinity of a combustion chamber 26 with a knocking sensor 28 comprising a piezoelectric element for sensing the vibration of the head so as to detect the state of combustion of an air/fuel mixture in the combustion chamber 26. The output of the knocking sensor 28 is sent to a control unit 30.

Figure 2:
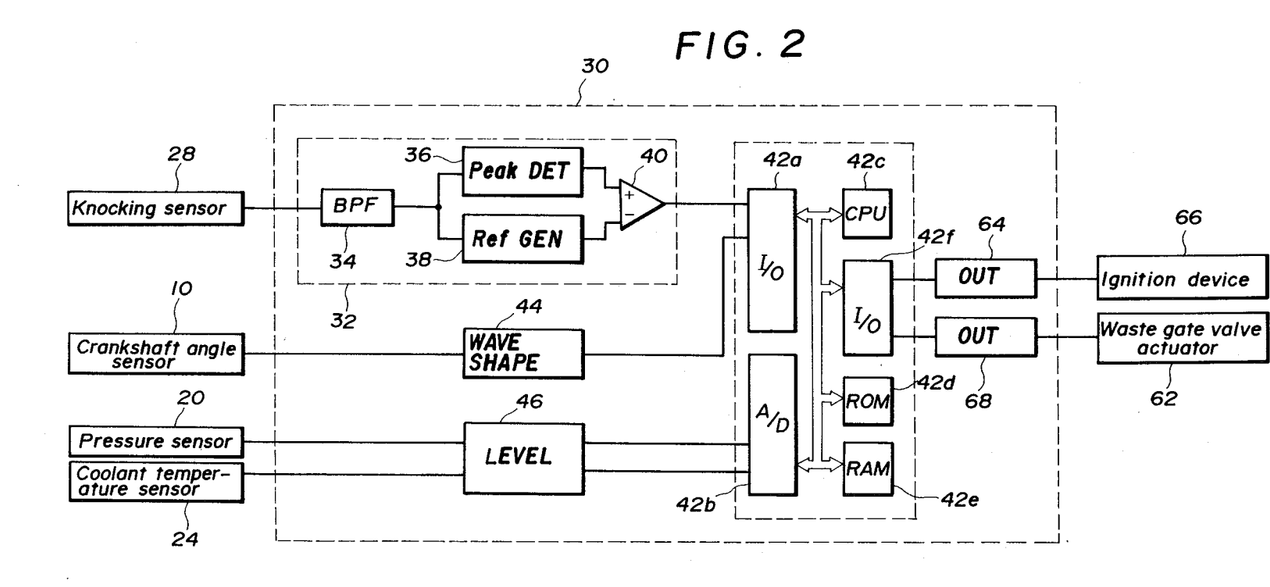
FIG. 2 is a block diagram showing the detailed structure of a control unit of the apparatus.

The detailed arrangement of the control unit 30 is shown in FIG. 2. In the control unit 30, the signal from the knocking sensor 28 is sent to a knocking detection circuit 32 where it is initially input to a band pass filter 34 for extraction of only the knocking frequency component. The output of the band pass filter 34 is, on the one hand, sent to a peak detection circuit 36 where the peak value of the knocking signal is detected. It is also forwarded to a comparison reference value generator 38 where the mean value of the signal from the knocking sensor 28 during non-knocking operation is determined. The outputs of the peak detection circuit 36 and the comparison reference value generator 38 are sent to a comparator 40 where the two outputs are compared and when the peak value exceeds the mean value, it is determined that knocking has occurred. The stage following the knocking detection circuit 32 is a microcomputer 42. The main components of the microcomputer 42 are an input panel 42a, an A/D (analog/digital) converter 42b, a CPU (central processing unit) 42c, a ROM (read-only memory) 42d, a RAM (random access memory) 42e and an output panel 42f. The output of the knocking detection circuit 32 is input to the microcomputer 42 and stored in the ram 42e.

The output of the crankshaft angle sensor 10 is also input to the control unit 30, wherein it is first shaped by a wave-shaping circuit 44 and then input to the microcomputer 42 via the input panel 42a for storage in the RAM 42e. The outputs from the pressure sensor 20 and the coolant temperature sensor 24 are also input to the control unit 30 where they are first level-converted to a predetermined level in a level converter 46 and then converted to digital form by the A/D converter 42b, whereafter they are stored in the RAM 42e.

Returning to FIG. 1, the internal combustion engine 12 is equipped with a turbocharger 50. Specifically, a turbine 52 disposed in an exhaust passage 54, is driven via a shaft 55 of a compressor 56 which forces pressurized intake air into the combustion chamber 26. The exhaust passage 54 is provided with a bypass 58 and a waste gate valve 60 is provided at the branching point between the exhaust passage 54 and the bypass 58. The waste gate valve 60 is connected with a waste gate valve actuator 62 which operates to open and close the waste gate valve 60 to regulate the amount of exhaust gas passing through the bypass 58 and thus regulate the boost pressure. More specifically, when the waste gate valve 60 is opened, the boost pressure is reduced. There is also provided a regulating means such as a relief valve (not shown) for preventing the boost pressure from rising above a prescribed level.

In the apparatus of the aforesaid structure, the CPU 42c of the microcomputer 42 calculates the engine speed from the output of the crankshaft angle sensor 10, and using the calculated engine speed and the output of the pressure sensor 20, as address data, retrieves a basic ignition timing from the map stored in the ROM 42d. It also adjusts the so-determined basic timing on the basis of the output of the coolant temperature sensor 24 and further, from the output of the knocking detection circuit 32, calculates an adjustment amount for knocking prevention which it uses to adjust the ignition timing to its final value. As shown in FIG. 2, an ignition command based on the final ignition timing is sent via a first output circuit 64 to an ignition device 66 constituted of an igniter and a distributor (neither shown), thus igniting an air/fuel mixture in the combustion chamber 26 via an ignition plug, not shown. As will be explained in greater detail later, the CPU 42c also sends a command to the waste gate valve actuator 62 via a second output circuit 68, whereby the opening of the waste gate valve 60 is regulated for controlling the boost pressure.

The operation of the apparatus as well as an embodiment of a control method according to the invention will now be explained with reference to the flowchart of FIG. 3. This program is started at a prescribed crankshaft angle or at prescribed time intervals.

In step 70 a basic ignition timing $\theta b$ is determined in the manner described above and a coolant temperature adjustment is added to the so-determined basic ignition timing. The basic ignition timing $\theta b$ is further adjusted by adding a battery voltage adjustment and the like thereto. The procedure then moves to step 72 where a knocking adjustment amount $\theta kc$ is calculated. This calculation is carried out in accordance with the sub-routine shown in the flowchart of FIG. 4. In the first step 72a of this sub-routine, it is determined whether or not knocking has occurred. This determination is made on the basis of the output of the knocking detection circuit 32. When it is found that knocking has occurred, the procedure moves to step 72b where the knocking adjustment amount $\theta kc$ is calculated by the subtraction of a predetermined amount $d\theta R$. (In this flowchart, retardation of the ignition angle is shown as subtraction while advancement thereof is shown as addition. The initial value of the knocking adjustment amount $\theta kc$ is zero.) When it is determined in the step 72a that knocking has not occurred, the procedure moves to step 72c where it is determined whether a wait period (defined as a number of firings) has lapsed, and if it has not, the procedure moves to step 72d where the knocking adjustment amount $\theta kc$ is left unchanged, and if it has, the procedure moves to step 72e where the knocking adjustment amount $\theta kc$ is adjusted in the direction of advance by a prescribed amount $d\theta A$. The prescribed values $d\theta R$ and $d\theta A$ and the wait period may be fixed or may be varied depending on the engine operating condition.

Figure 3:
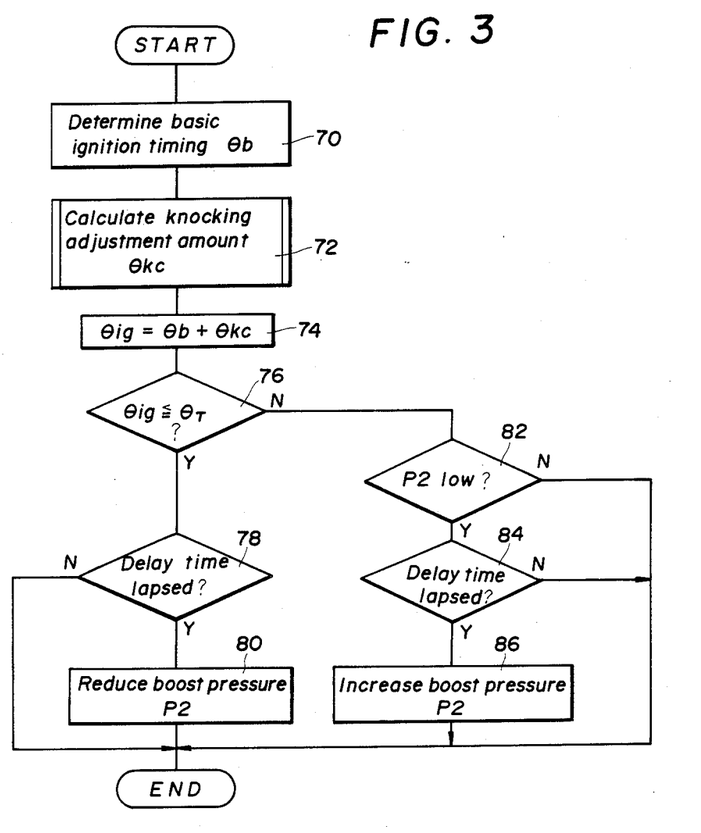
FIG. 3 is a flowchart showing the operation of the apparatus as well as an embodiment of a method of controlling boost pressure in a turbocharged internal combustion engine according to the present invention.
Figure 4:
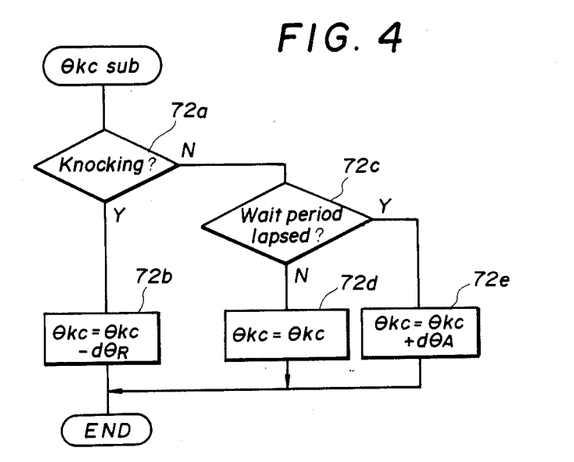
FIG. 4 is a flowchart showing a sub-routine of the flowchart of FIG. 3 for calculating an ignition adjustment amount for knocking prevention.

Returning to the flowchart of FIG. 3, in the succeeding step 74, the knocking adjustment amount $\theta$kc is added to the basic ignition timing $\theta$b to obtain the final and actual ignition timing $\theta$ig. In this case, since the knocking adjustment amount $\theta$kc is either zero or a negative value, the result is that when knocking occurs the actual ignition timing $\theta$ig is retarded by a like amount.

Figure 5:
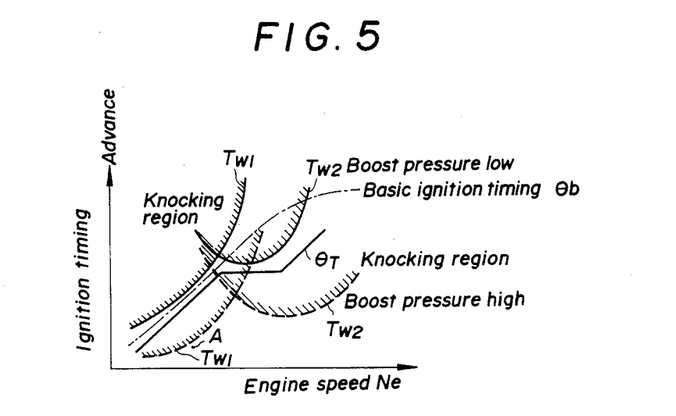
FIG. 5 is a graph for explaining the ignition timing (reference level) at which the boost pressure is reduced.
Figure 6:
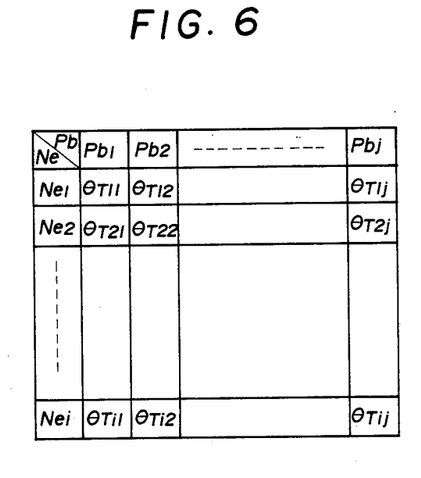
FIG. 6 is a table for explaining ignition timing values for boost pressure reduction which are stored in a ROM (read-only memory) of a microcomputer.

The procedure then moves to step 76 where the actual ignition timing $\theta$ig is compared with a prescribed reference ignition timing $\theta$T to determine whether or not the actual ignition timing $\theta$ig is equal to or smaller than (i.e. more retarded than) the reference ignition timing $\theta$T. The reference ignition timing $\theta$T corresponds to the reference level for reducing the boost pressure explained with reference to FIG. 7. One characteristic feature of the present invention is that the boost pressure is reduced when the actual ignition timing has come to exceed the reference ignition timing. This reference ignition timing $\theta$T will now be explained with reference to FIG. 5. In an internal engine equipped with a turbocharger, since the engine is in principle operated at a high boost pressure, when the coolant temperature rises the knocking region shifts into the retarded ignition timing region indicated by the broken-line curves Tw1 and Tw2 (high and low coolant temperatures). Therefore, the actual ignition timing $\theta$ig is retarded with respect to the basic ignition timing $\theta$b, for example, to the value represented by the point A. As a result, it falls below (becomes more retarded than) the reference ignition timing $\theta$T. As was explained earlier, in the present invention the control operation to reduce the boost pressure begins from this time. More specifically, while the prior art practice reduces the boost pressure when the amount of retardation d$\theta$R exceeds a prescribed reference level, in the present invention the ignition timing which is actually applied to the engine is compared with the reference level (the reference ignition timing) and the decision to reduce the boost pressure is based on the result of this comparison. The reduction of boost pressure is thus carried out more directly than in the prior art and, as a result, it becomes possible to carry out control of the boost pressure in a manner that is better matched to the actual engine operating condition. It should also be noted that once the boost pressure has been reduced, the knocking region will shift in the direction of ignition advance to the position indicated by the solid line curves Tw1 and Tw2 so that the actual ignition timing $\theta$ig will again be advanced to near the basic ignition timing $\theta$b. Therefore, as will be explained later, the boost pressure is again increased with an accompanying rise in the engine output. Further, the present invention is arranged such that the reference ignition timing $\theta$T on which the decision whether to reduce the boost pressure is based is varied depending on the engine operating condition, more precisely is increased or decreased depending on the engine speed and/or the intake air pressure. Specifically, similarly as the actual ignition timing $\theta$ig is varied depending on the engine operating state, so is the reference ignition timing $\theta$T. As a result it becomes possible to carry out control of the boost pressure in a manner that even more accurately reflects the actual operating condition of the engine. FIG. 6 shows values of the reference ignition timing $\theta$T that are stored in the ROM 42d of the microcomputer 42 in the form of a map. The mapped values are retrieved using the engine speed NE and the intake pressure Pb as address data. It may be alternatively possible to use an arrangement which enables retrieval of the data of FIG. 6 using one or the other of the engine speed and the intake air pressure alone as the address data.

Returning to the flowchart of FIG. 3, when it is determined in the step 76 that the actual ignition timing $\theta$ig is more retarded than the reference ignition timing $\theta$T, the procedure moves to step 78 where it is determined whether a predetermined delay time has passed. This operation is included to prevent engine output hunting from being caused by a sudden change in the boost pressure. Once lapse of the delay time has been confirmed in the step 78, the procedure moves to step 80 where the boost pressure P2 is reduced. This is accomplished by turning off a solenoid (not shown) in the waste gate valve actuator 62, thus opening the waste gate valve 60 and bypassing the flow of exhaust gas. When it is determined in the step 76 that the actual ignition timing $\theta$ig is more advanced than the reference ignition timing $\theta$T, the procedure moves to step 82 where it is determined whether the boost pressure P2 is in the reduced state, and if it is, a delay time is allowed to pass similarly to the case of the step 78, whereafter the boost pressure P2 is increased by closing the waste gate valve 60. If the boost pressure P2 is not at low level or if the delay time has not yet passed, the procedure of the program is concluded (steps 84 and 86).

The present invention is arranged such that the boost pressure is reduced when the ignition timing falls below a prescribed value. The decision whether to reduce the boost pressure is thus made on the basis of the ignition timing actually being used to control the engine. Thus the decision in accordance with this invention is made in a more direct manner than that in the conventional technique which bases the decision on the amount of retardation. Therefore, it becomes possible to carry out optimum control of the engine operation in a manner that is well matched to changes in the engine operating condition and changes in the engine operating environment, whereby no danger of damage to the engine arises and unnecessary reduction of engine output can be avoided.

The present invention has thus been shown and described with reference to specific embodiments. However, it should be noted that the present invention is in no way limited to the details of the described arrangements but changes and modifications may be made without departing from the scope of the appended claims.

What is claimed is:

1. An apparatus for controlling ignition timing and boost pressure in an internal combustion engine equipped with a turbocharger for applying a boost pressure into a combustion chamber of the engine, comprising:

a first means for detecting an angular position of an engine crankshaft to generate an output signal indicative of engine speed;

a second means for detecting a state of engine load to generate an output signal in response thereto;

a third means for detecting a knock condition of the engine to generate an output signal in response thereto;

ignition control means for receiving the output signals of the first, second and third means to determine a basic ignition timing of the engine based upon the detected engine speed and when the knock condition is detected, adjusting the basic ignition timing in a retard direction;

ignition means for receiving an output signal of the ignition control means to ignite an air/fuel mixture in the combustion chamber of the engine;

boost pressure reduction control means for receiving the output signal of the ignition control means to compare the determined ignition timing with a reference ignition timing and when the determined ignition timing is found to exceed the reference ignition timing in the retard direction, generating an output signal to reduce the boost pressure applied to the engine through the turbocharger, said boost pressure reduction control means further receiving the output signals of the first and second means to determine said reference ignition timing based upon the detected engine speed and engine load; and actuator means for receiving the output signal of the boost pressure reduction control means to open a waste gate valve provided at an exhaust passage of the engine so as to reduce the boost pressure of the turbocharger.

2. An apparatus according to claim 1, wherein said boost pressure reduction control means generates the output signal to reduce the boost pressure after a predetermined time has lapsed, when the ignition timing is found to be more retarded than the reference ignition timing.

* * * * *